United States Patent
Hsu et al.

(10) Patent No.: US 12,160,171 B2
(45) Date of Patent: Dec. 3, 2024

(54) DRIVING METHOD FOR SWITCHING CIRCUIT POWER CONVERTER AND DRIVING MODULE THEREOF

(71) Applicant: INFSITRONIX TECHNOLOGY CORPORATION, Jhubei (TW)

(72) Inventors: Chung-Jye Hsu, Jhubei (TW); Yuan-Kai Cheng, Jhubei (TW); Chun-Chiang Chen, Jhubei (TW)

(73) Assignee: Infsitronix Technology Corporation, Jhubei (TW)

( * ) Notice: Subject to any disclaimer, the term of this patent is extended or adjusted under 35 U.S.C. 154(b) by 126 days.

(21) Appl. No.: 17/697,180

(22) Filed: Mar. 17, 2022

(65) Prior Publication Data

US 2022/0352815 A1 Nov. 3, 2022

Related U.S. Application Data

(60) Provisional application No. 63/162,094, filed on Mar. 17, 2021.

(51) Int. Cl.
*H02M 1/44* (2007.01)
*H02M 1/08* (2006.01)

(52) U.S. Cl.
CPC ............... *H02M 1/44* (2013.01); *H02M 1/08* (2013.01)

(58) Field of Classification Search
CPC ....... H02M 1/44; H02M 1/08; H02M 3/33523
See application file for complete search history.

(56) References Cited

U.S. PATENT DOCUMENTS

| | | | |
|---|---|---|---|
| 9,083,250 B2 * | 7/2015 | Adragna | H02M 3/33507 |
| 10,256,735 B2 * | 4/2019 | Tao | H02M 3/335 |
| 2019/0296630 A1 | 9/2019 | Low et al. | |
| 2020/0036280 A1 | 1/2020 | Yang et al. | |
| 2020/0144923 A1 | 5/2020 | Cohen | |
| 2020/0328687 A1 | 10/2020 | Radic | |
| 2020/0395857 A1 | 12/2020 | Hwang | |
| 2023/0058021 A1 * | 2/2023 | Liu | H02M 1/0025 |

FOREIGN PATENT DOCUMENTS

| | | |
|---|---|---|
| CN | 1973421 A | 5/2007 |
| CN | 104052276 A | 9/2014 |
| JP | 6210024 B2 | 10/2017 |
| TW | 201124809 A | 7/2011 |

OTHER PUBLICATIONS

Office Action issued to Taiwanese counterpart Application No. 111109957 on Jan. 7, 2023.
Search Report issued to Taiwanese counterpart Application No. 111109957 on Jan. 7, 2023.

* cited by examiner

*Primary Examiner* — Kyle J Moody
(74) *Attorney, Agent, or Firm* — Rosenberg, Klein & Lee

(57) ABSTRACT

The present invention is a switching circuit driving method for power converters and its driving module. Such driving method and driving module can avoid the occurrence of valley jumping by replacing the original blanking time with a front blanking time or a back blanking time when a valley jumping occurs in the system, and avoid the noise problem caused by valley jumping.

15 Claims, 9 Drawing Sheets

DRIVING METHOD FOR SWITCHING CIRCUIT POWER CONVERTER AND DRIVING MODULE THEREOF

FIELD OF THE INVENTION

The present invention generally relates to a driving method for a switching circuit of a power converter and the driving module thereof, and particularly to a driving method for a switching circuit of a power converter capable of operating in the quasi-resonant mode and the driving module adopted in the driving method.

BACKGROUND OF THE INVENTION

Compared to power converters of other types, switching power converters, such as flyback converters, not only own succinct circuit architecture and higher energy conversion efficiency but also provide multiple current outputs with high efficiency. Thereby, they are widely applied to various products.

Switching power converters such as flyback converters can operate in the quasi-resonant (QR) mode, which can detect possible parasitic oscillations in windings of power converters after the previous driving cycle ends (winding degaussing). The valleys of the parasitic oscillations represent a lower voltage difference across both terminals of a switch. Thereby, in the next driving cycle, the switch can be controlled to be turned on at the valleys.

An existing implementation is to routinely control the switch to operate on detection of the first valley. Nonetheless, when the load is lighter, the appearance of the first valley of parasitic oscillation is earlier; contrarily, when the load is heavier, the appearance of the first valley of parasitic oscillation is slower. Therefore, in this implementation, the operating frequency of the system will be higher when the load is lighter and lower when the load is heavier. Consequently, the energy conversion efficiency is inferior.

Accordingly, as shown in FIG. 1, an improved implementation is to add a blanking time "Blanking" when the system detects valleys of parasitic oscillation. The length of the blanking time "Blanking" can be inversely proportional to the output power of the power converter. As shown on the left of the figure, when the load is lighter, since the output power of the system is not high, the blanking time "Blanking" is longer. Then the first three valleys of parasitic oscillation will be blanked. The system will detect the pulse signal V4 of the fourth valley and control the switch to operate. Contrarily, as shown on the right of the figure, the output power of the system is higher, making the blanking time "Blanking" shorter. In this case, only the first valley of parasitic oscillation is blanked. The system will detect the pulse signal V2 of the second valley and control the switch to operate. Thereby, the energy conversion efficiency will be enhanced effectively.

Unfortunately, in practical applications, the loading condition varies at any time, leading to the valley jumping behavior of the system in specific operating conditions. As shown in FIG. 2, the example on the left of FIG. 1 is enlarged for illustration. Assume that the length of the blanking time "Blanking" is close to the time when the third valley appears. At first, if the system detects the pulse signal V4 of the fourth valley and controls the switch to operate at this moment. When the system detects the pulse signal V3 of the third valley for the first time due to an increase in load and controls the switch to operate, the operating frequency of the system will be increased and hence the current will be decreased. However, the decrease in current will advance the appearance of the third valley and make the third valley very possibly fall into the blanking time "Blanking" again. Then the system will soon recover to control the switch to operate at the fourth valley. In such operating conditions, the switch should be turned on at the third and the fourth valley alternately for balancing and outputting the output power required by the system.

The switching frequency of the valley jumping behavior as described above is uncontrollable. If the switching frequency falls within the audio frequency range, serious noise will occur. Additional sound insulation processes such as pouring sealant should be performed on the power converter, resulting in extra volume and production costs. Accordingly, the existing driving method for a switching circuit of a power converter should be improved.

SUMMARY

An objective of the present invention is to provide a driving method for a switching circuit of a power converter and the driving module thereof. When valley switches occur in a system, a front blanking time or a back blanking time is generated additionally to replace the original blanking time for avoiding valley jumping and the noise problem caused by valley jumping. Windings of the switching circuit include a parasitic oscillation with multiple valleys.

To achieve the above objective, the present invention provides a driving method for a switching circuit of a power converter, which comprises steps of: a driving module calculating an original blanking time according to an output power of a power converter; the driving module calculating to generate a front blanking time and a back blanking time according to the original blanking time, the front blanking time being shorter than the original blanking time, and the back blanking time being longer than the original blanking time; the driving module detecting valley switches, identifying an ordinal number of one of the valleys at which the switching circuit is switched, replacing the original blanking time by the back blanking time if the ordinal number is increased, and replacing the original blanking time by the front blanking time if the ordinal number is decreased; and detecting a first valley right after the original blanking time, the back blanking time, or the front blanking time, and controlling the switching circuit to switch.

To achieve the above objective, the present invention further provides a driving module, which comprises a blanking-time calculation unit and a valley-switch detection unit. The blanking-time calculation unit calculates the original blanking time, the front blanking time, and the back blanking time according to a output power of the power converter. The valley-switch detection unit identifies an ordinal number of one of the valleys at which the switching circuit is switched. The valley-switch detection unit and the blanking-time calculation unit are coupled to each other. If the ordinal number is increased, replace the original blanking time by the back blanking time. Contrarily, if the ordinal number is decreased, replace the original blanking time by the front blanking time.

DETAILED DESCRIPTION

Figure 1:
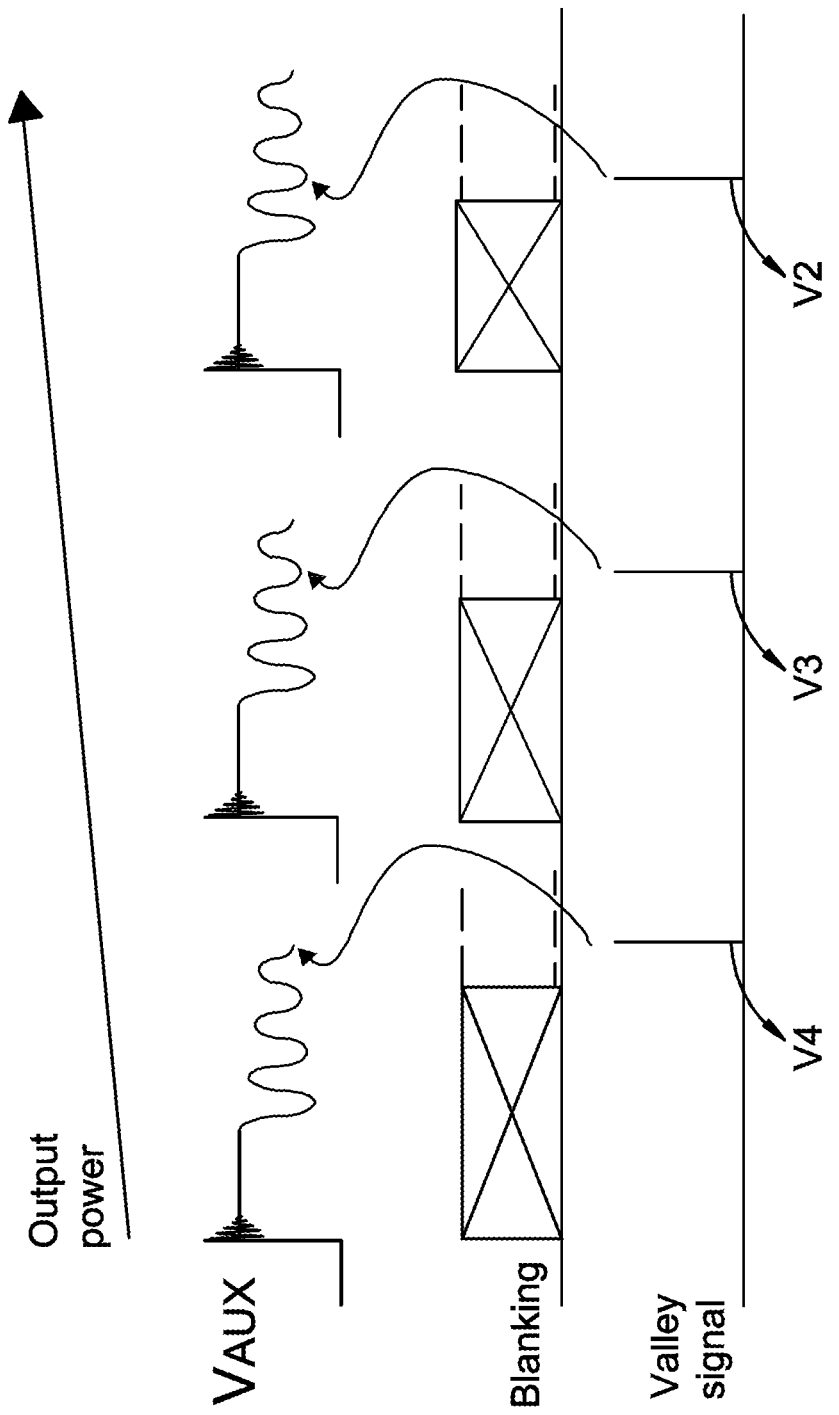
FIG. 1 shows a schematic diagram of signals in a power converter operating in the quasi-resonant mode.
Figure 2:
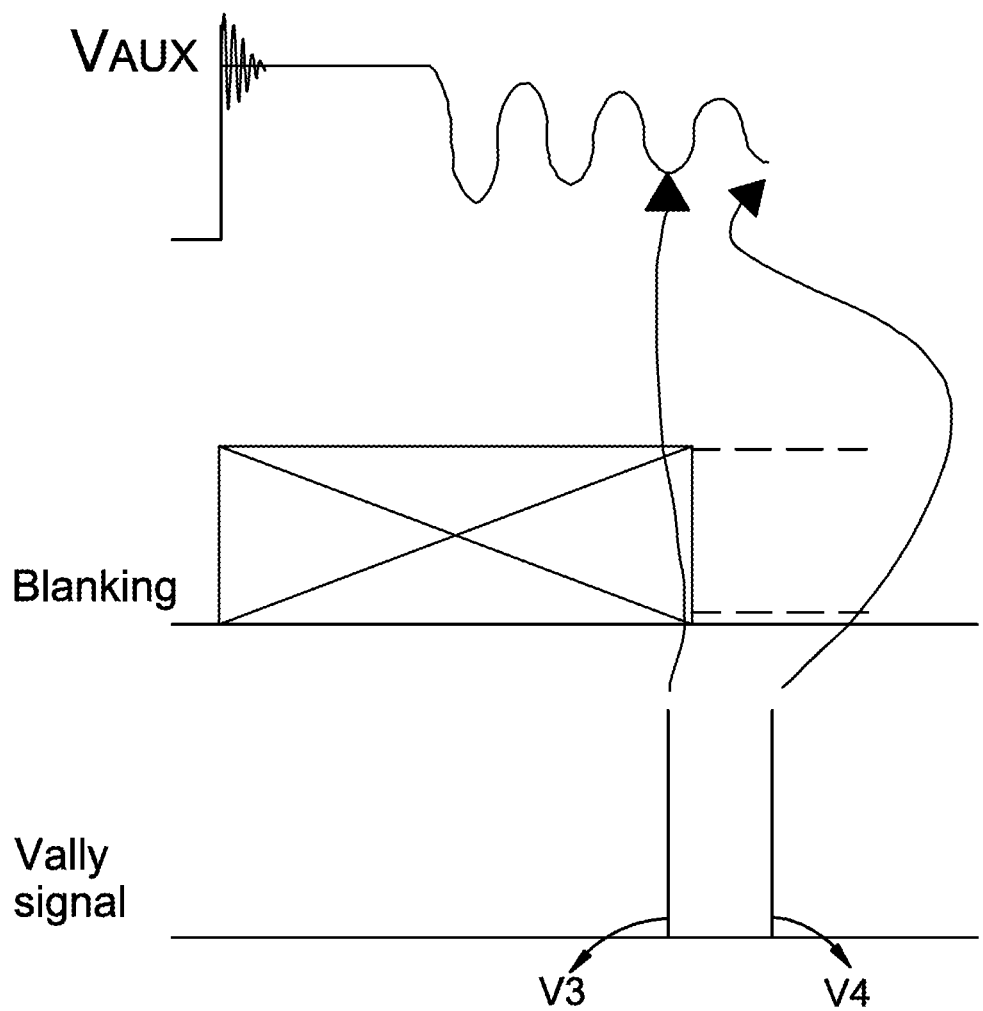
FIG. 2 shows a schematic diagram of valley jumping in the quasi-resonant mode.

In order to make the structure and characteristics as well as the effectiveness of the present invention to be further understood and recognized, the detailed description of the present invention is provided as follows along with embodiments and accompanying figures.

In the specifications and subsequent claims, certain words are used to represent specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the entire specifications and subsequent claims, the word "comprising" is an open language and should be explained as "comprising but not limited to". Besides, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In the following description, various embodiments of the present invention are described using figures for describing the present invention in detail. Nonetheless, the concepts of the present invention can be embodied by various forms. Those embodiments are not used to limit the scope and range of the present invention.

The driving method for a switching circuit of a power converter is used to control a switching power converter with a switching circuit. The switching power converter such as flyback converters can operate in the quasi-resonant mode. First, please refer to FIG. 3, the driving method for a switching circuit of a power converter according to the present invention can calculate an original blanking time according to the output power of the power converter. For example, when the system detects that the switch is switched at the n-th valley of the parasitic oscillation in the windings, the original blanking time calculated according to the output power at this moment can be expressed as TB(n). The length of the original blanking time TB(n) can be inversely proportional, or at least negatively correlated, to the output power of the power converter. The present embodiment does not adjust it.

In addition to calculating the original blanking time TB(n), a front blanking time TB(n−1) and a back blanking time TB(n+1) will be calculated according to the present embodiment. The front blanking time TB(n−1) is given by subtracting a deadzone time Δt from the original blanking time TB(n); the back blanking time TB (n+1) is given by adding a deadzone time Δt to the original blanking time TB(n). The deadzone time Δt can be calculated according to the parasitic oscillation occurred in the windings. If the parasitic oscillation has a resonant period $T_R$, the deadzone time Δt is preferably greater than or equal to the resonant period $T_R$. According to another embodiment of the present invention, the front blanking time TB(n−1) is given by subtracting a first deadzone time Δt1 from the original blanking time TB(n); the back blanking time TB(n+1) is given by adding a second deadzone time Δt2 to the original blanking time TB(n). The lengths of the first deadzone time Δt1 and the second deadzone time Δt2 can be different. Likewise, to ensure better performance, the first deadzone time Δt1 and the second deadzone time Δt2 are preferably greater than or equal to the resonant period $T_R$.

Figure 3:
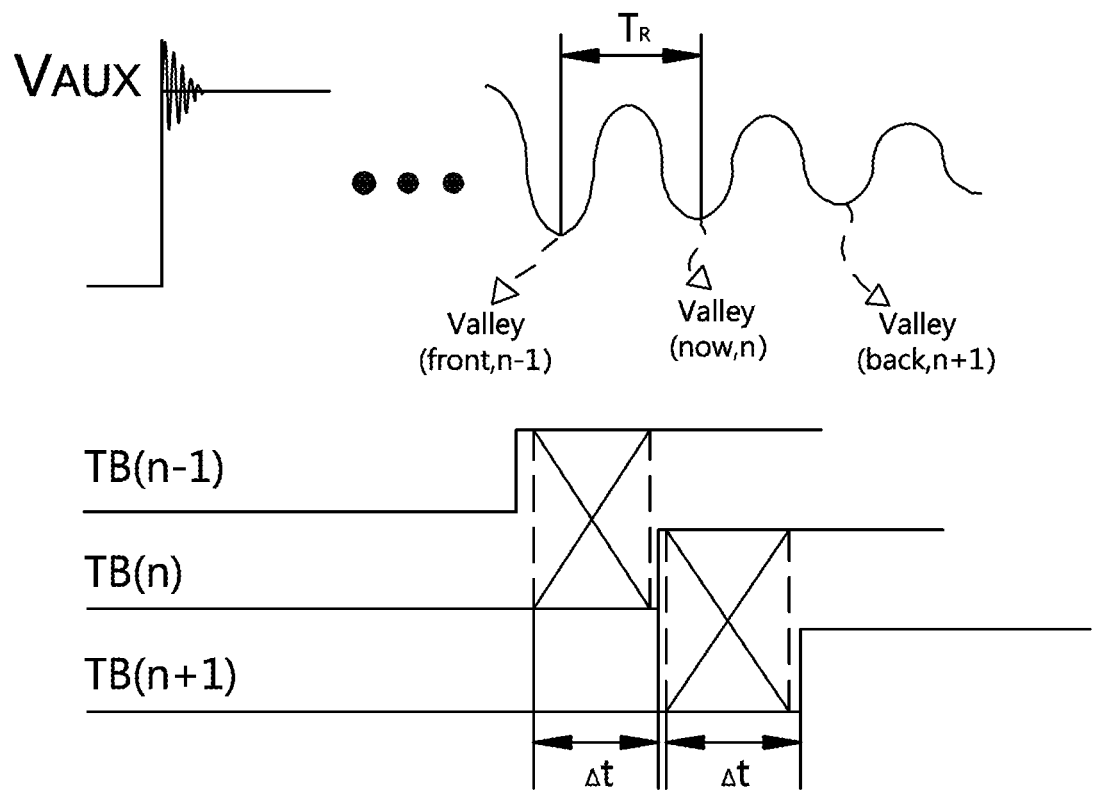
FIG. 3 shows a schematic diagram of signals in the driving method for a switching circuit of a power converter according to an embodiment of the present invention.

Please notice that in FIG. 3, the original blanking time TB(n), the front blanking time TB(n−1), and the back blanking time TB(n+1) are expressed by a low voltage level, meaning that the blanking is effective at the low voltage level and the parasitic oscillation will be blanked. On the other hand, a high voltage level indicates ending of the original blanking time and the parasitic oscillation will no longer be blanked. Nonetheless, the above example is only used to illustrate the embodiment according to the present invention. In practice, the signals for the original blanking time are designed according to circuit requirements. The present invention is not limited to the example.

Figure 4A:
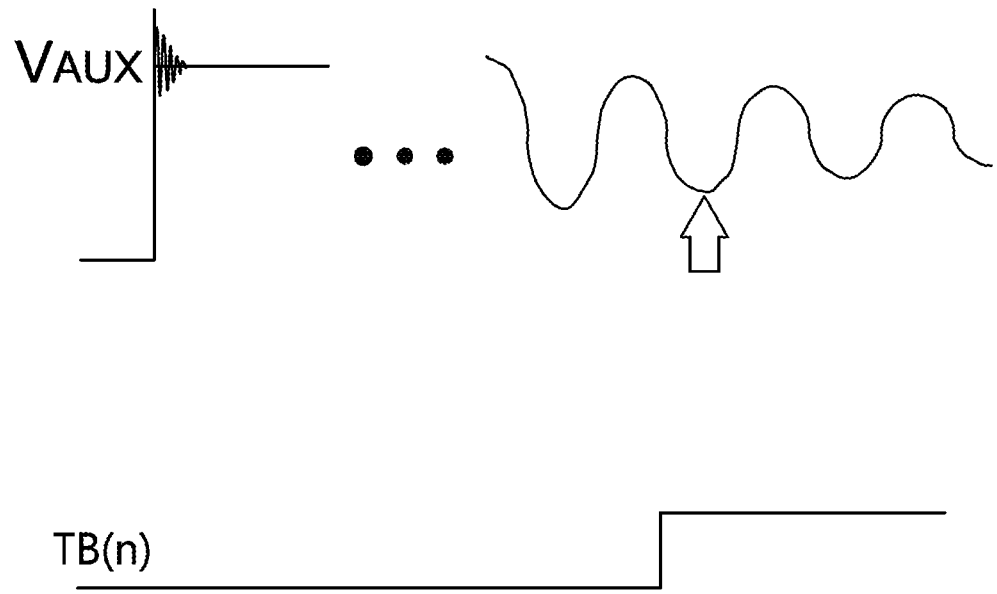
FIG. 4A shows a schematic diagram of signals at the initial state according to the above embodiment.

The following will describe why and how to calculate the front blanking time TB(n−1) and the back blanking time TB(n+1) according to the embodiment of the present invention will be described. As shown in FIG. 4A, when the original blanking time is TB(n), the first to the (n−1)-th valleys of the parasitic oscillation are blanked. Thereby, the system will detect the n-th valley and control the switch to operate at this moment.

Figure 4B:
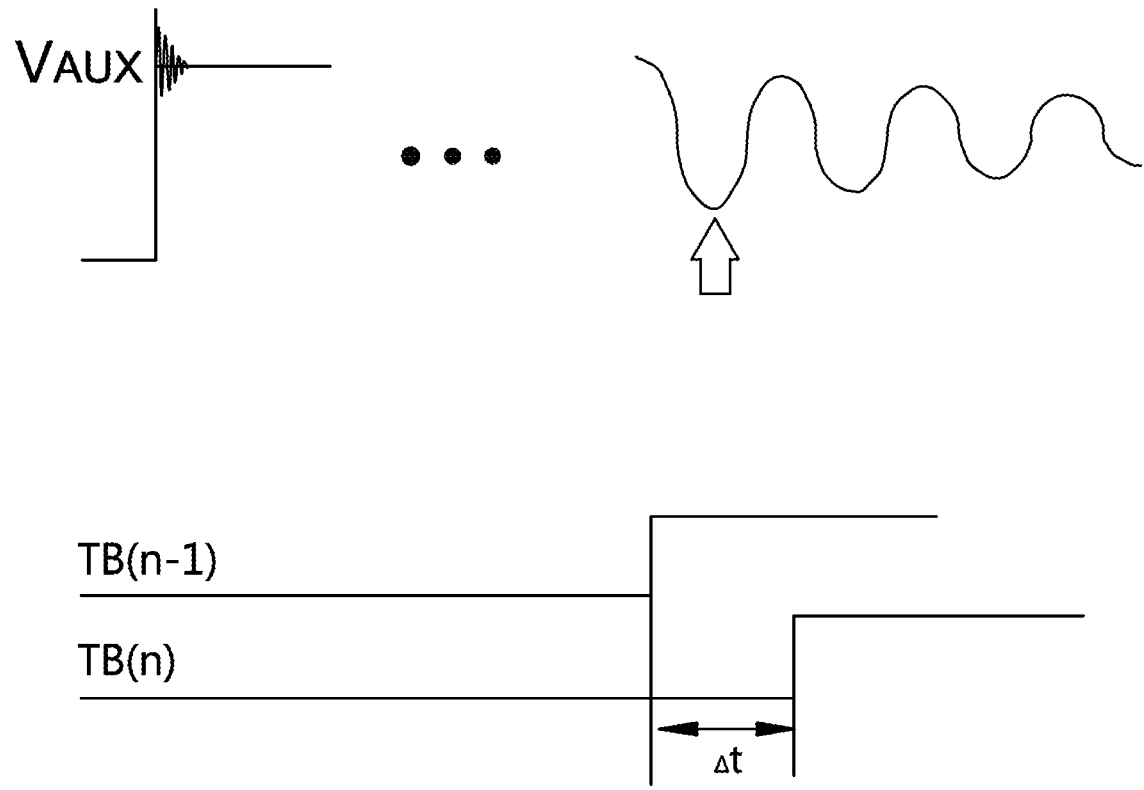
FIG. 4B shows a schematic diagram of signals while switching to detect the previous valley according to the above embodiment.

As shown in FIG. 4B, owing to changes in the loading condition, the valleys switch. For example, when the load increases, the previous valley (i.e., the (n−1)-th valley) might be detected. Upon detection of the switch, according to the embodiment of the present invention, the original blanking time TB(n) will be replaced by the calculated front blanking time TB(n−1), meaning that a deadzone time Δt will be subtracted from the original blanking time TB(n) and shortening the blanking time original blanking time. Thereby, even if the current is decreased, advancing the appearance of the (n−1)-th valley, it is not likely that the valley is blanked again. Then the system will still control the switch to operate at the (n−1)-th valley. In other words, according to the embodiment of the present invention, by adjusting the original blanking time TB(n) to be the front blanking time TB(n−1), the valley jumping can be avoided effectively. Since the front blanking time TB(n−1) is shorter than the original blanking time TB(n) by a deadzone time Δt, which can be greater than the resonant period $T_R$, it is easier for the system to control the switch to operate at the (n−1)-th valley.

Figure 4C:
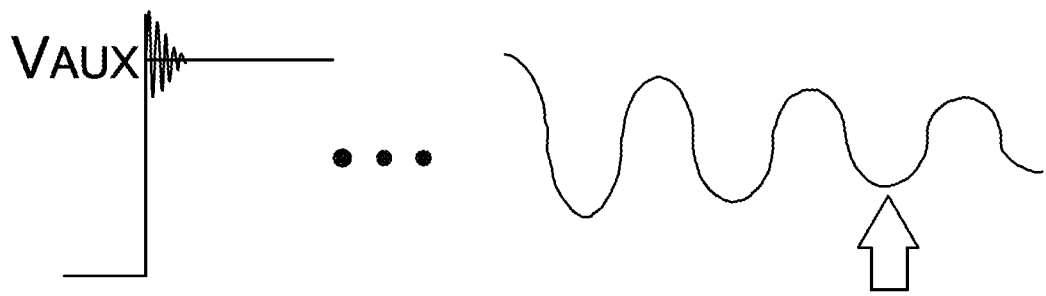
FIG. 4C shows a schematic diagram of signals while switching to detect the next valley according to the above embodiment.
Figure 4C:
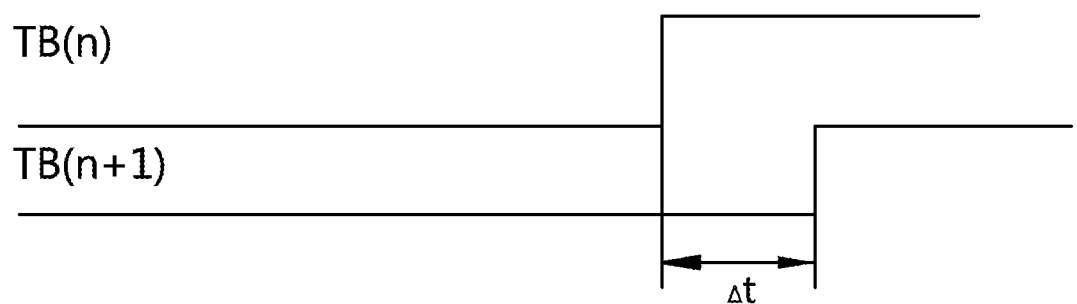

On the contrary, as shown in FIG. 4C, when the load decreases, the next valley (i.e., the (n+1)-th valley) might be detected. Upon detection of the switch, according to the embodiment of the present invention, the original blanking time TB(n) will be replaced by the calculated back blanking time TB(n+1), meaning that a deadzone time Δt will be added to the original blanking time TB(n) and extending the original blanking time. Thereby, even if the current is increased and hence deferring the appearance of the n-th valley, it is not likely to be detected beyond the back blanking time TB(n+1). Then the system will still control the switch to operate at the (n+1)-th valley. In other words, according to the embodiment of the present invention, by adjusting the original blanking time TB(n) to be the back blanking time TB(n+1), the valley jumping can be avoided effectively. Since the back blanking time TB(n+1) is longer than the original blanking time TB(n) by a deadzone time Δt, which can be greater than the resonant period $T_R$, it is easier for the system to control the switch to operate at the (n+1)-th valley.

No matter the front blanking time TB(n−1) or the back blanking time TB(n+1) is adopted to replace the original blanking time TB(n), the driving method according to the embodiment of the present invention adds a debounce time to the operation so that the system use the front blanking time TB(n−1) or the back blanking time TB(n+1) at least to the debounce time. Since valley jumping is not likely to happen in the debounce time, if the system can balance the debounce time and output the required output power, the system will operate stably and avoid the noise problem caused by valley jumping.

To elaborate, the output power of a power converter can be expressed as:

$$P = L_p \times I^2 \times F$$

where $L_p$ is the primary inductance; I is the input current; and F is the switching frequency. Assume that the system is initially set to detect the n-th valley and control the switch to operate. When the load is increased, the system switches to detect the (n−1)-th valley. The output power before and after the switch $P_{crititcal1}$, $P_{critical2}$ can be expressed as the following two equations:

$$P_{critical1} = L_p \times I_{max}^2 \times F_{min,n}$$

$$P_{critical2} = L_p \times I_{max}^2 \times F_{max,n-1}$$

If the system does not execute the driving method according to the embodiment of the present invention and if the output power exceeds the power required by the load after the switch, the system will feedback for lowering the current and increasing the switching frequency, leading to re-detection of the n-th valley. Then the valley jumping phenomenon will occur to balance the output power.

Once the driving method according to the embodiment of the present invention is executed, the front blanking time TB(n−1) can be adopted to prevent the valley jumping phenomenon. The use of the front blanking time TB(n−1) can be maintained for at least the debounce time. Thereby, in the debounce time, although the system will still feedback for lowering the current and increasing the switching frequency, once the following equation is satisfied, the system can balance the debounce time and output the required output power, instead of re-detecting the n-th valley. $P_{need}$ in following equation represents the required output power; a is a feedback correction parameter.

$$P_{need} = \left(\frac{1}{a} I_{max}\right)^2 \times (aF_{max,n-1}) < I_{max}^2 \times F_{max,n-1}$$

Figure 5:
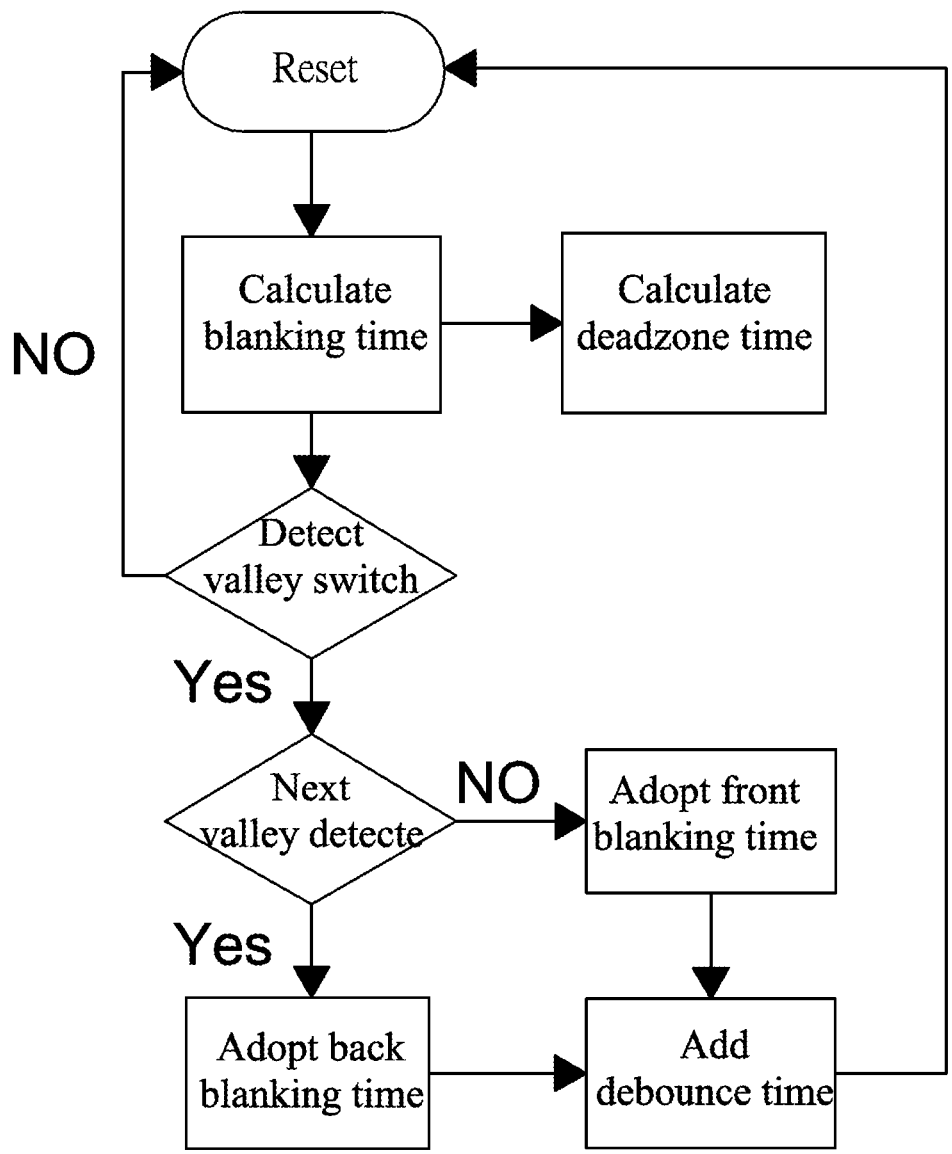
FIG. 5 shows a control flowchart of a driving method for a switching circuit of a power converter according to the present invention.

Accordingly, the driving method for a switching circuit of a power converter according to the above embodiment of the present invention can be organized as the control flowchart shown in FIG. 5. The details will be described below.

Calculate original blanking time: Calculate an original blanking time TB(n) according to the output power of the power converter. Subtract a deadzone time from the original blanking time TB(n) to generate a front blanking time TB(n−1). Add a deadzone time from the blanking time original blanking time TB(n) to generate a back blanking time TB(n+1).

Calculate deadzone time: Calculate the deadzone time required by the front blanking time. The deadzone time Δt is preferably greater than or equal to the resonant period $T_R$ of the parasitic oscillation occurring in the windings. Thereby, a suitable length of the deadzone time Δt can be determined according to the resonant period $T_R$. It is noteworthy that the resonant period $T_R$ can be calculated according to the parasitic oscillation of the windings. Alternatively, since the parasitic oscillation is caused by the inductance of the windings and the parasitic capacitance (such as the parasitic capacitance of the switch), the resonant period $T_R$ is roughly constant for the same system. Thereby, the resonant period $T_R$ can be measured and stored in advance for presetting the deadzone time, instead of calculating it in real time.

Detect valley switch: When the system operates in the quasi-resonant mode, if the system is set to detect the n-th valley initially, then the valley switch detection means detecting if the system still maintains detecting the n-th valley (no switch occurs). Alternately, the system might detect the (n+1)-th valley (switch occurs and the next valley is detected), or the system might detect the (n−1)-th valley (switch occurs and the previous valley is detected).

Adopt back blanking time: When valley switch is detected and the (n+1)-th valley is detected, the back blanking time TB(n+1) is adopted to replace the original blanking time TB(n).

Adopt front blanking time: When valley switch is detected and the (n−1)-th valley is detected, the front blanking time TB(n−1) is adopted to replace the original blanking time TB(n).

Add debounce time: The system maintains using the front blanking time TB(n−1) or the back blanking time TB(n+1) for at least a debounce time. The system tries to balance the debounce time and output the output power without re-detecting the n-th valley.

Figure 6:
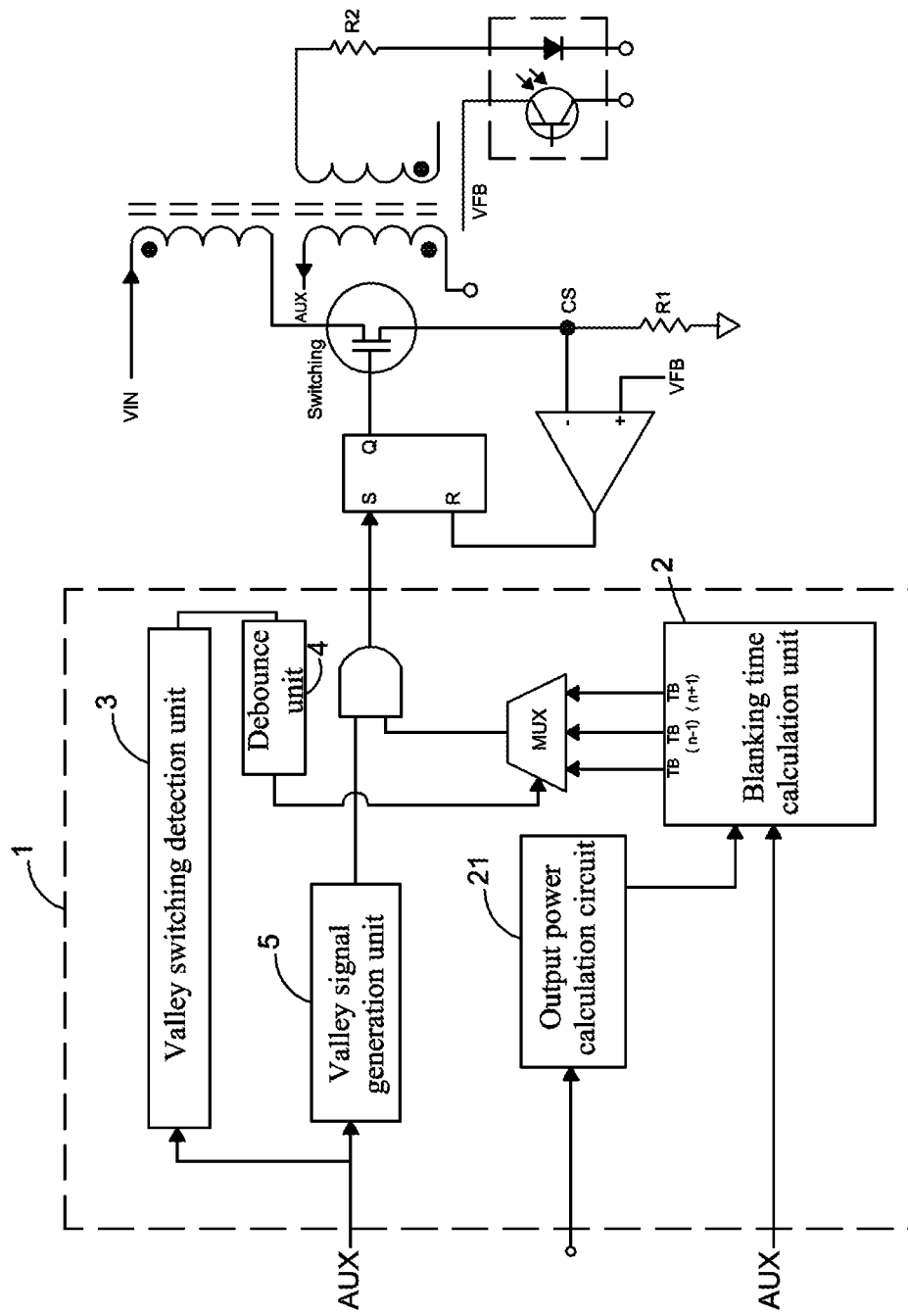
FIG. 6 shows a schematic diagram of a driving module for implementing the driving method for a switching circuit of a power converter according to the present invention as described above.

FIG. 6 shows a schematic diagram of a driving module 1 for implementing the driving method for a switching circuit of a power converter according to the present invention as described above. The driving module 1 comprises a blanking-time calculation unit 2, a valley-switch detection unit 3, a debounce unit 4, and a valley-signal generation unit 5.

The blanking-time calculation unit 2 calculates an original blanking time TB(n) according to the output power of the power converter, and subtracting a deadzone time from the original blanking time TB(n) to generate a front blanking time TB(n−1) and adding a deadzone time to the original blanking time TB(n) to generate a back blanking time TB(n+1). The blanking-time calculation unit 2 can include an output-power calculation circuit 21, which can calculate to give the output power of the power converter according to the information including the current CS of the primary winding, the discharge time of the windings, or and feedback voltage VFB of the error in the secondary winding. The present invention does not limit the method to acquire the information of output power. In some specific applications, if the information of output power is available in the system already, the output-power calculation circuit 21 can be omitted. In addition, the blanking-time calculation unit 2 can receive the voltage signals from the windings. In general, the signals are acquired by disposing an auxiliary winding (as shown in the figure). Thereby, the signal acquired is actually the auxiliary voltage $V_{AUX}$ induced in the auxiliary winding. The auxiliary voltage $V_{AUX}$ can be used to calculate the resonant period $T_R$ of the parasitic oscillation occurring in the windings. Nonetheless, as described above, the resonant period $T_R$ or the deadzone time can be measured in advance and stored in a register.

The valley-switch detection unit 3 is used to detect if the system maintains to detect the n-th valley (no switch occurs). Alternately, the system might detect the (n+1)-th valley (switch occurs and the next valley is detected), or the system might detect the (n−1)-th valley (switch occurs and the previous valley is detected).

The valley-switch detection unit 3 is coupled to the debounce unit 4, which is used for adding a debounce time. The blanking-time calculation unit 2 and the debounce unit 4 are coupled to a multiplexer MUX. Thereby, when the valley-switch detection unit 2 detects valley switch and the switch occurs at the (n+1)-th valley, the multiplexer MUX is controlled to adopt the back blanking time TB(n+1) and the debounce time is maintained. When the valley-switch detection unit 2 detects valley switch and the switch occurs at the (n−1)-th valley, the multiplexer MUX is controlled to adopt the front blanking time TB(n−1) and the debounce time is maintained.

The valley-signal generation unit 5 generates the pulse signal of each valley according to the voltage signal of the winding (according to the present embodiment, the auxiliary voltage $V_{AUX}$), and transmits the pulse signal and original blanking time output by the multiplexer MUX to an AND gate. Thereby, the first valley after the original blanking time can be detected and used for controlling the switch "Switching" to be turned on at this valley.

Figure 7:
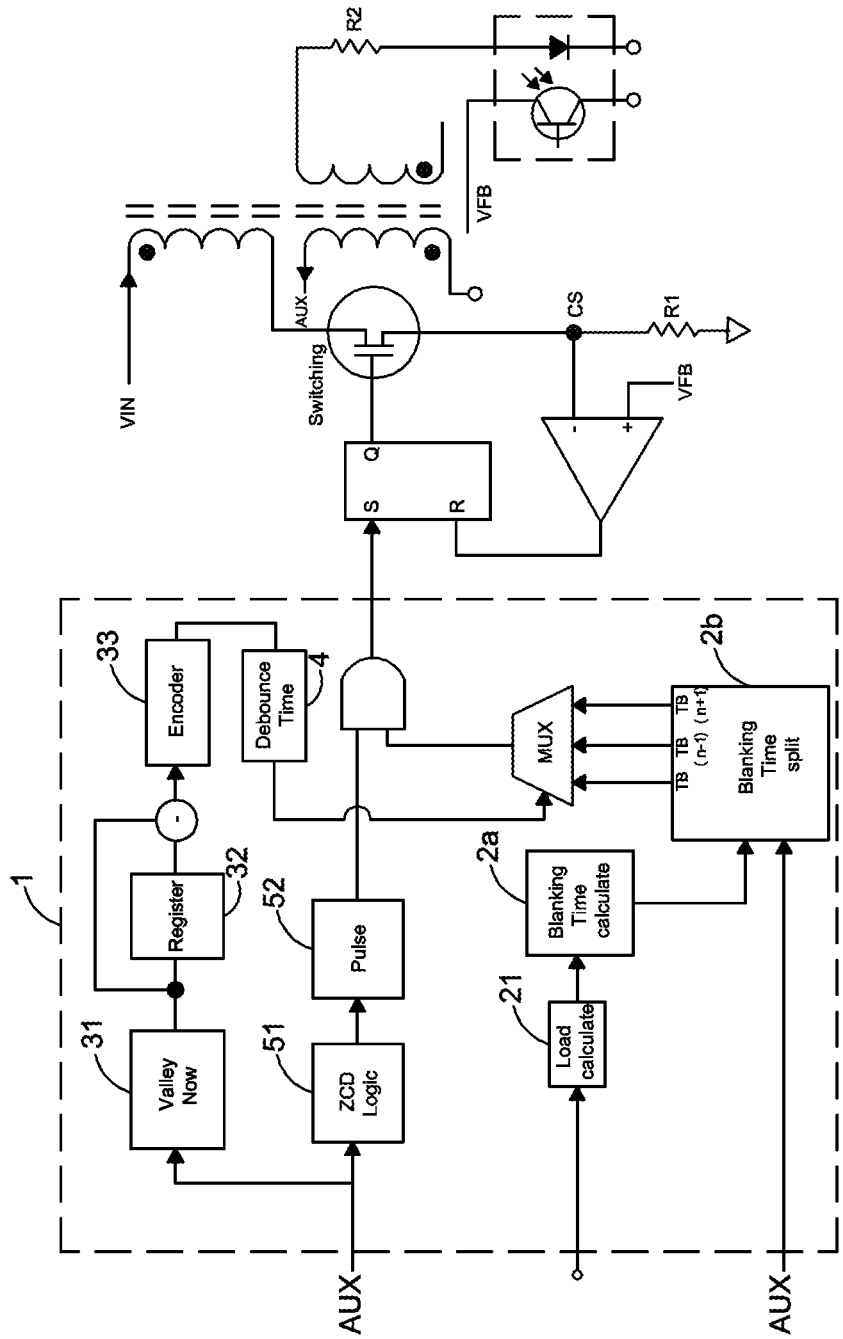
FIG. 7 shows a schematic diagram of the circuit architecture of the driving module.

FIG. 7 shows a schematic diagram of the circuit architecture forming the driving module 1. Depending on the signal for calculating power, the output-power calculation circuit 21 of the blanking-time calculation unit 2 might include circuits such as multipliers and integrators. The blanking-time calculation unit 2 can be further divided into a blanking-time calculation unit 2a and a blanking-time split unit 2b. The blanking-time calculation unit 2a is used for calculating the original blanking time TB(n), which is inversely proportional or negatively correlated to the output power. The blanking-time split unit 2b can calculate the resonant period $T_R$ of parasitic oscillation according to the auxiliary voltage $V_{AUX}$ and hence further setting a deadzone time. Nonetheless, the resonant period $T_R$ or the deadzone time can be measured in advance and stored in a register. Besides, the blanking-time split unit 2b is also used for subtracting a deadzone time from the original blanking time TB(n) to generate a front blanking time TB(n−1) and adding a deadzone time to the original blanking time TB(n) to generate a back blanking time TB(n+1).

The valley-switch detection unit 3 can be formed by using the simple circuits including a valley-switch detection circuit 31, a register 32, and an encoder 33. The valley-switch detection circuit 31 can include a counter, and calculate the order of the valley when the switch "Switching" is switched. Once the valley at which the switch "Switching" is switched is changed, the value in the register 32 will not be equal to the value of the valley-switch detection circuit 32. By subtracting the two values, whether the next or the previous valley at which the switch "Switching" is switched can be judged.

The debounce unit can include circuits used for adding a debounce time, such as a clock generation circuit and a delay circuit.

The valley-signal generation unit 5 can include a zero current detection (ZCD) circuit and a pulse generation circuit 52. Pulse signals can be generated by comparing the auxiliary voltage $V_{AUX}$ with a certain threshold value such as 0. By generating pulse signals capable of indicating each valley, the original blanking time output by the pulse signals and the multiplexer MUX can be used to detect the order of the first valley detected right after the original blanking time and control the switch "Switching" to be turned on at this valley.

By implementing the embodiments of the driving method for a switching circuit of a power converter or the driving module as described above, when valley switch occurs in a system, since the front blanking time TB(n−1) or the back blanking time TB(n+1) is adopted in the debounce time, the valley jumping can be avoided. If the system can balance the debounce time and output the required output power, it can operate stably and prevent the noise problem caused by the valley jumping. Compared to the prior art, the volume and production costs of the power converter according to the present invention can be reduced.

The invention claimed is:

1. A driving method for a switching circuit of a power converter, which is performed by a driving module, wherein windings of said switching circuit include a parasitic oscillation with multiple valleys, said driving method comprising steps of:
said driving module calculating an original blanking time according to an output power of said power converter;
said driving module calculating to generate a front blanking time and a back blanking time according to said original blanking time, said front blanking time being shorter than said original blanking time, and said back blanking time being longer than said original blanking time;
said driving module performing valley switching detecting, identifying an ordinal number of one of said valleys at which the switching circuit is switched, wherein said original blanking time is replaced by said back blanking time if said ordinal number is increased, and said original blanking time is replaced by said front blanking time if said ordinal number is decreased; and
detecting a first valley right after said original blanking time, said back blanking time, or said front blanking time, and controlling said switching circuit to switch.

2. The driving method for the switching circuit of the power converter of claim 1, where after said step of replacing said original blanking time by said back blanking time or said front blanking time, maintain using said back blanking time or said front blanking time for achieving at least a debounce time.

3. The driving method for the switching circuit of the power converter of claim 1, wherein said front blanking time is generated by subtracting a first deadzone time from said original blanking time; and said back blanking time is generated by adding a second deadzone time to said original blanking time.

4. The driving method for the switching circuit of the power converter of claim 3, wherein said first deadzone time is identical to said second deadzone time.

5. The driving method for the switching circuit of the power converter of claim 3, wherein; said parasitic oscillation includes a resonant period; and said first deadzone time and said second deadzone time are greater than or equal to said resonant period.

6. The driving method for the switching circuit of the power converter of claim 5, further comprising a step of calculating said resonant period according to said parasitic oscillation.

7. A driving module, coupled to a switching circuit of a power converter, wherein windings of said switching circuit include a parasitic oscillation with multiple valleys, said driving module comprising:
a blanking-time calculation unit, calculating an original blanking time according to an output power of said power converter, and generating a front blanking time and a back blanking time according to said original blanking time; and
a valley switching detection unit, coupled with said blanking-time calculation unit, said valley switching detection unit identifying an ordinal number of one of said valleys at which the switching circuit is switched, replacing said original blanking time by said back blanking time if said ordinal number is increased, and replacing said original blanking time by said front blanking time if said ordinal number is decreased.

8. The driving module of claim 7, wherein said valley-switch detection unit is coupled to a control node of a multiplexer, and said blanking-time calculation unit is coupled to inputs of said multiplexer; said multiplexer outputs one of said blinking time, said back blanking time, and said front blanking time according to control of said valley-switch detection unit.

9. The driving module of claim 7, and further comprising a debounce unit, coupled to said valley-switch detection unit, wherein said blanking-time calculation unit is coupled to inputs of a multiplexer, and said debounce unit is coupled to an control node of said multiplexer, for controlling said multiplexer to output one of said blinking time, said back blanking time, and said front blanking time according to control of said valley-switch detection unit, and maintaining a debounce time.

10. The driving module of claim 8 or claim 9, and further comprising a valley-signal generation unit, said valley-signal generation unit generating a pulse signal of each valley according to the parasitic oscillation of said windings, said valley-signal generation unit detecting a first valley after said original blanking time, said back blanking time, or said front blanking time according to said pulse signal and the output of said multiplexer, and controlling said switching circuit to switch.

11. The driving module of claim 7, wherein said front blanking time is generated by subtracting a first deadzone time from said original blanking time; and said back blanking time is generated by adding a second deadzone time to said original blanking time.

12. The driving module of claim 11, wherein said first deadzone time is greater than said second deadzone time.

13. The driving module of claim 11, wherein said parasitic oscillation includes a resonant period; and said first deadzone time and said second deadzone time are greater than or equal to said resonant period.

14. The driving module of claim 13, wherein said blanking-time calculation unit calculates said resonant period according to said parasitic oscillation.

15. The driving module of claim 11, wherein said blanking-time calculation unit includes an output-power calculation circuit for calculating the output power of said power converter.

* * * * *